Dec. 31, 1963    J. B. NICHOLS    3,116,036
LONG RANGE CONVERTIBLE HELICOPTER
Filed April 17, 1961    6 Sheets-Sheet 1

INVENTOR.
John B. Nichols
BY Bialos & Schlemmer
Attorneys

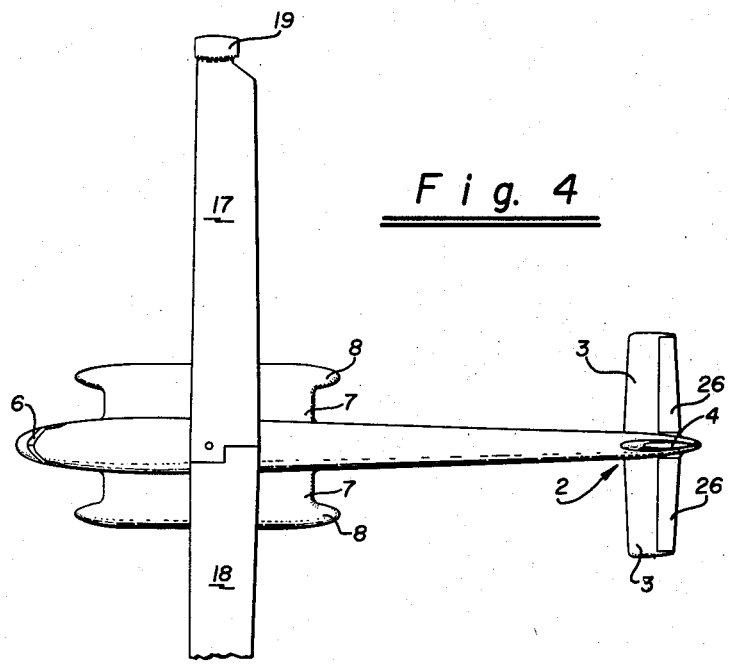
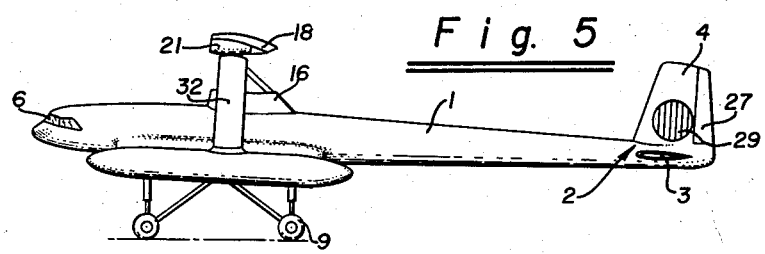
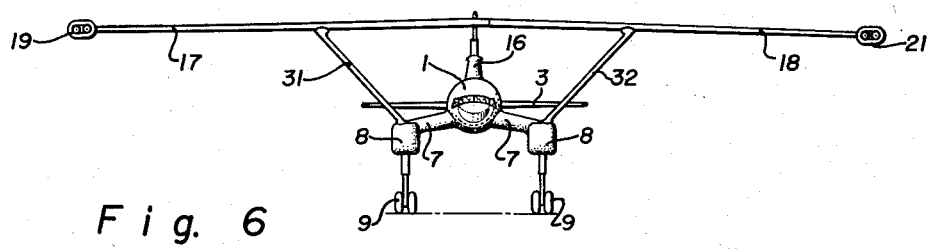

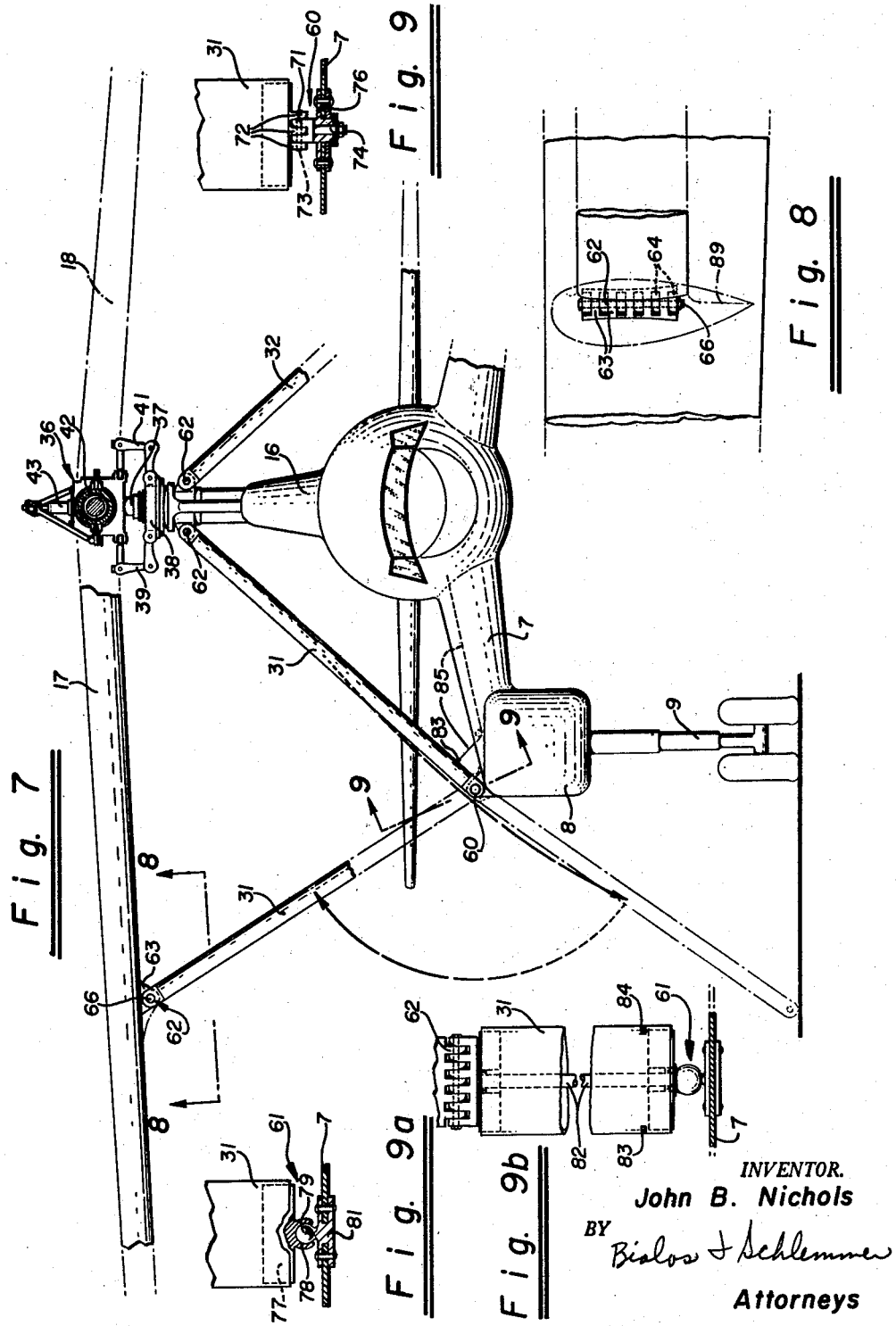

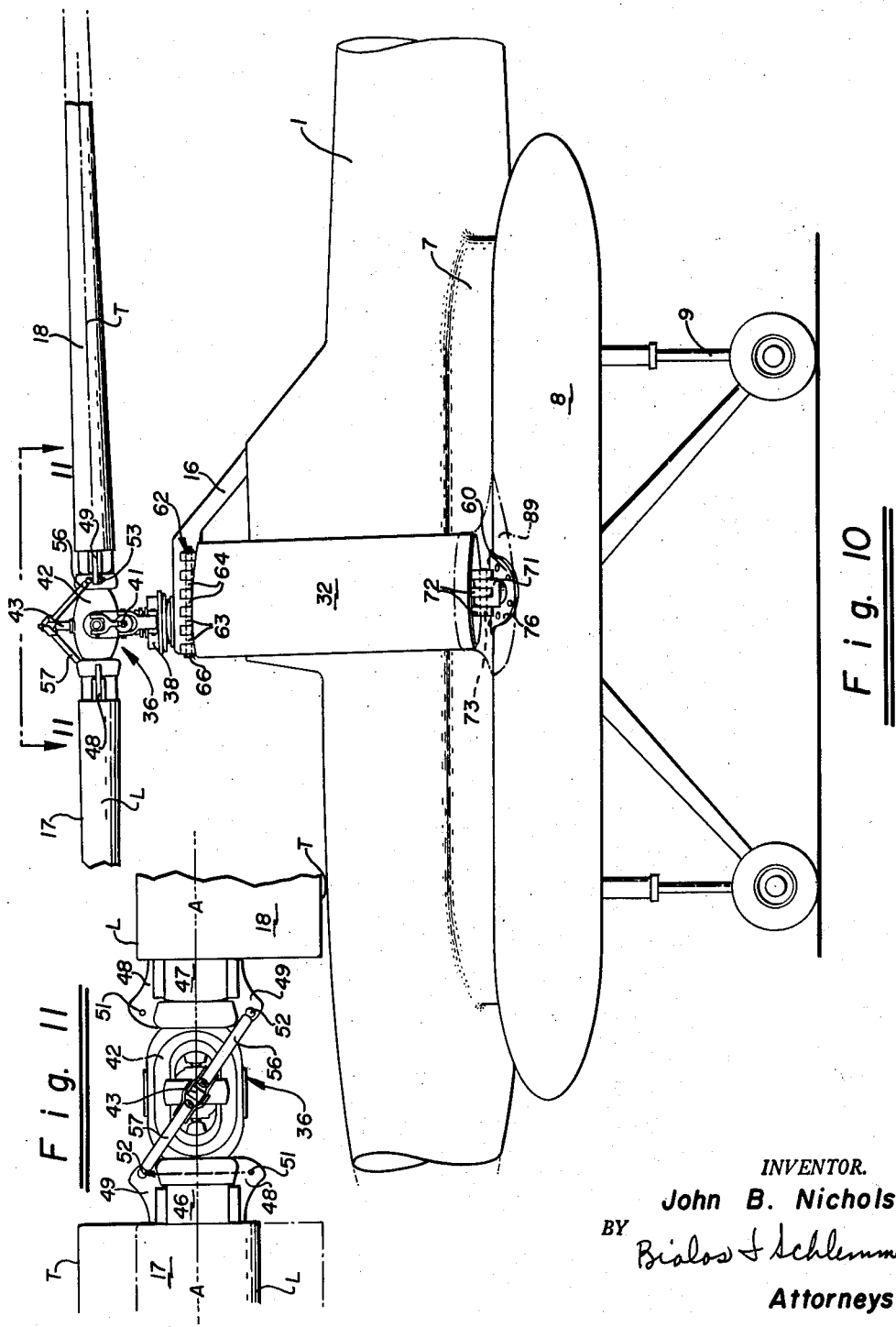

INVENTOR.
John B. Nichols
BY
Bialos & Schlemmer
Attorneys

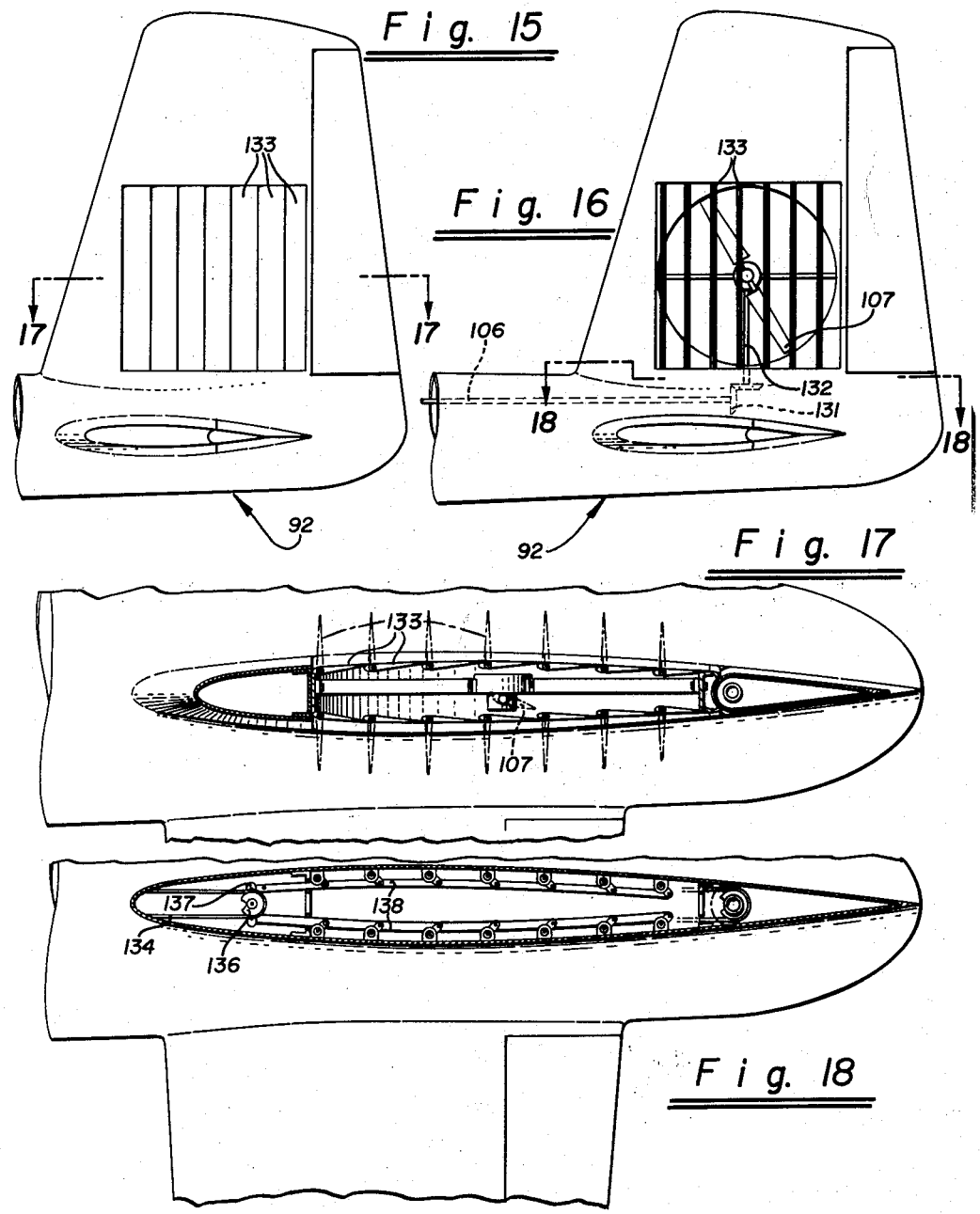

United States Patent Office 3,116,036
Patented Dec. 31, 1963

3,116,036
LONG RANGE CONVERTIBLE HELICOPTER
John B. Nichols, Atherton, Calif., assignor, by mesne assignments, to Eltra Corporation, Brooklyn, N.Y., a corporation of New York
Filed Apr. 17, 1961, Ser. No. 103,647
12 Claims. (Cl. 244—7)

This invention relates generally to aircraft which are capable of vertical take-offs and landings, and more particularly relates to helicopter type aircraft which are convertible for operation essentially as fixed wing type aircraft. That is, the subject invention relates to an aircraft which normally has rotary blades or wings positioned for rotation above the fuselage so that the aircraft may be operated as a conventional helicopter but in which the wings may be re-oriented on the ground to extend transversely of the aircraft fuselage and secured against rotation to provide the principal airfoil fixed wing lift surfaces so that the aircraft may be flown generally as a conventional fixed wing aircraft.

When the aircraft wings are oriented on the ground for fixed wing type flight, the aircraft is adapted for long distance flights so that the same may be ferried across oceans and the like under its own power whereby the need for disassembly of the aircraft at one location and reassembly at a distant location is precluded. Following such a ferrying flight, it is a simple matter to reconvert the aircraft for its primary function, namely helicopter type flight.

While the hereafter described aircraft construction is employable with aircraft of varying sizes, the same has particular utility in large size helicopter aircraft frequently referred to as flying cranes. Furthermore, while the subject invention is particularly well adapted for use with helicopters which employ wing tip propulsion means, the invention, as will be pointed out, is not intended to be limited to use in such constructions.

Helicopter type aircraft are well known to be much less efficient than fixed wing aircraft in forward flight due to factors such as their lower lift-to-drag ratio. This results in the helicopter range being substantially less than the range of a comparable size fixed wing aircraft. Standard helicopter ranges rarely exceed six or seven hundred miles. This range limitation affects the capability of a helicopter type aircraft to transport or ferry itself over long non-stop distances, such as across oceans or the like.

While small helicopters, like other vehicles, have often been conveyed heretofore in large transport vehicles, such as large fixed wing transport aircraft or marine ships, such a procedure is generally inconvenient in that it usually requires at least partial disassembly and crating of the aircraft. The amount of disassembly required is determined by the size of the helicopter involved with larger helicopters requiring complete or substantially complete disassembly for transportation in such other vehicles. As a result, major reassembly facilities at the terminal point of the shipment are required to ready the disassembled helicopters for flight. This presents a problem, particularly with respect to the use of military helicopters during wartime. In this connection, while hereinafter reference will be directed to military type aircraft and operations, it should be understood that the inventive concept and advantages disclosed are equally applicable to commercial and civilian aircraft and operations.

In summary, the problem of transporting helicopter type aircraft over long distances has been dealt with heretofore in various manners, which, as noted above, primarily were centered on arrangements for making helicopters easier to fold or disassemble so that the same could be more easily carried by other vehicles. However, none of these folding and disassembly systems has proved entirely satisfactory due to various considerations, such as the requirement for reassembly. The subject invention, however, involves a unique approach to the problem which relates to the rapid and easy conversion of a rotary wing aircraft into a fixed wing type aircraft so that the same may be readied for long distance ferrying flights.

In present day military operations overseas, particularly those involving missile bases and the like, in which construction and transporting problems frequently occur, the characteristics of the conventional large helicopter to assist in construction and transportation operations is well known. However, the lack of long range ferrying capability in conventional helicopters has limited their usefulness in this regard in that, as noted previously, it presently is necessary to disassemble the aircraft for transportation and then to reassemble the same near the area of intended use. This disassembly and assembly requirement is undesirable because, even with rapid modes of transportation presently known, the time and facilities necessary to effect disassembly and reassembly make such procedures impractical when viewed in light of the speed in which modern military situations develop.

Furthermore, because of the limited range of helicopters, the reassembly facilities must be located close to the area of intended use, which generally is closely adjacent to enemy occupied territory. As a result, such facilities are vulnerable to enemy attack or sabotage. Accordingly, whenever possible it is highly desirable to dispense with the need for such facilities. By providing the subject convertible aircraft and a method for converting the same between helicopter type flight and fixed wing type flight, the requirement for substantial overseas reassembly facilities may be dispensed with.

In conjunction with the subject invention, recent changes in the helicopter art have resulted in helicopters becoming more efficient. For example, rotary wing blade areas are generally being increased as altitude performance requirements increase. Changes such as this enhance the effectiveness of the subject aircraft after its conversion from a helicopter to a fixed wing type aircraft.

While it has been broadly suggested in the helicopter art heretofore to attempt conversion of a helicopter type aircraft to a fixed wing type aircraft, such suggested aircraft were designed for conversion in the air. That is, such aircraft were designed to take off vertically and, while in flight, to be transformed to a fixed wing aircraft, and subsequently to be reconverted to a helicopter type aircraft for a vertical landing operation. Attempts along these lines have been unsuccessful because of the insurmountable problems attendant to in-flight conversion. Furthermore, with such suggested arrangements, the long range ferrying potential of the subject invention was absent.

In distinction, the subject aircraft is intended to be converted on the ground from a helicopter to a fixed wing type aircraft, and vice versa. As a result, the subject concept is very different from that envisioned for prior suggested convertible aircraft which, as noted previously, have not proved satisfactory, due primarily to the complicated mechanisms required for in-air conversion and the danger attendant to attempted in-air conversion.

With this background in mind, objects of the present invention include the following: the provision of a helicopter type aircraft which is convertible to a fixed wing type aircraft; the method of converting a helicopter type aircraft on the ground into a fixed wing type aircraft; the provision of a helicopter type aircraft having long range ferrying capability; and the provision of a helicopter type aircraft which may be ferried under its own power without disassembly and subsequent reassembly at a distant location. These and other objects will become evident from the following specification in which reference is directed to the accompanying drawings.

FIGS. 4 through 6 are plan, side elevational, and front elevational views, respectively, of the preferred embodiment of the subject aircraft with the wings thereof positioned transversely of the aircraft for conventional fixed wing type flight.

FIG. 7 is a partial front elevational view of the subject aircraft illustrating the supporting strut means employed therewith.

FIG. 8 is a bottom plan view of the aircraft wing taken in the plane of line 8—8 of FIG. 7.

FIG. 9 is a partial side elevational view of the strut means taken in the plane of line 9—9 of FIG. 7.

FIG. 9a is a view similar to FIG. 9 illustrating a modified pivot arrangement for the strut means.

FIG. 9b is a side elevational view of a modified strut.

FIG. 10 is a partial side elevational view of the subject aircraft illustrating the strut means arranged for helicopter type flight.

FIG. 11 is a partial plan view of the rotor head assembly of the subject aircraft taken in the plane of line 11—11 of FIG. 10.

FIGS. 15 and 16 are side elevational views of the tail structure of the subject aircraft illustrating the tail rotor construction employed therewith.

Figure 1:
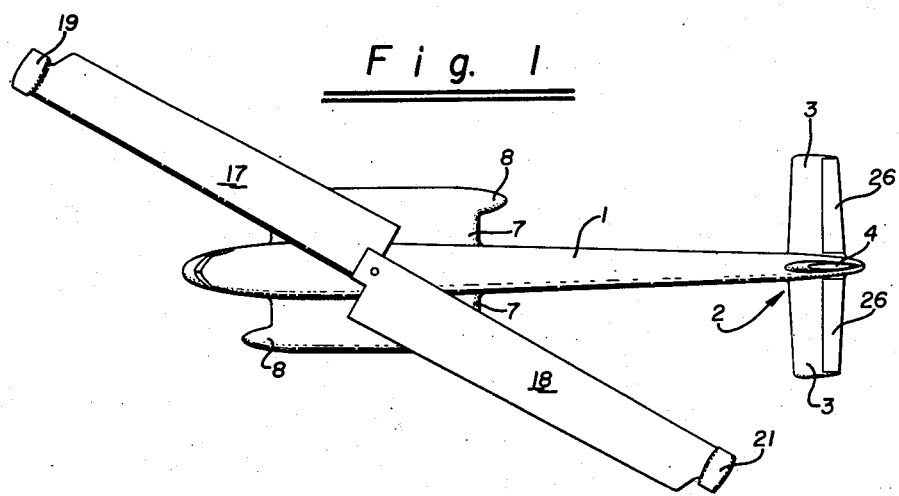
FIGS. 1 to 3 are somewhat schematic plan, side elevational, and front elevational views, respectively, of a preferred embodiment of the subject aircraft with the wings thereof arranged for conventional helicopter type flight.

FIGS. 17 and 18 are horizontal sectional views taken generally in the planes of lines 17—17 and 18—18, respectively, of FIGS. 15 and 16 illustrating further details of the construction of the tail structure.

Referring first to the generally schematic showings of FIGS. 1 through 6, a preferred embodiment of the subject aircraft comprises a fuselage 1 which includes a tail structure 2 comprised of horizontal stabilizers 3 and an upright stabilizer 4. A pilot's compartment 6 is provided in the nose of the aircraft in the usual manner. The fuselage includes a pair of generally horizontally extending fuselage stub sections 7 on the outboard ends of which are provided landing gear enclosures 8 into which spaced multiwheel landing gear structures 9 are retractable in any well known manner.

Figure 3:
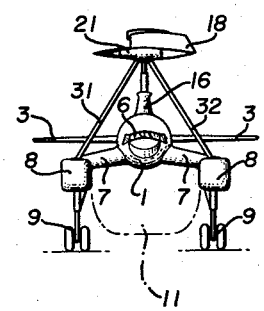

Preferably, the landing gear enclosures 8 are spaced from each other a distance sufficient that the aircraft fuselage may be positioned over a cargo to be lifted thereby, such as a unitary cargo pod 11, illustrated in phantom lines in FIG. 3. While the subject aircraft is well adapted for use as a large cargo type aircraft of the type shown, its applicability to smaller and more conventional helicopters also is contemplated. In those aircraft of the type illustrated in which a cargo pod is anticipated to be used, any conventional retractable cable means (not shown) may be employed for maintaining the cargo pod operatively connected with the underside of the fuselage sections 7 during flight.

Figure 2:
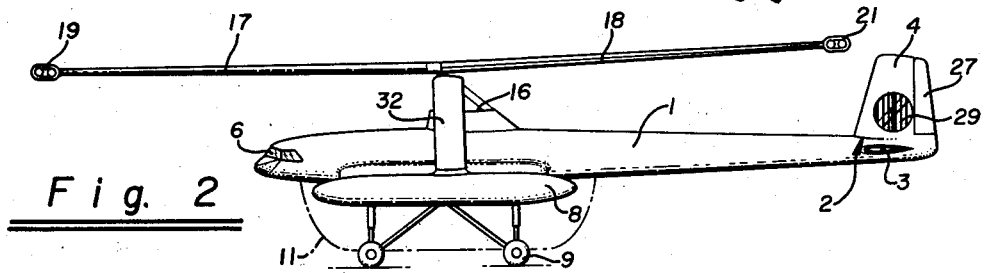

A rotor column or pylon 16 projects upwardly from the top of the aircraft fuselage and is surmounted by a pair of oppositely extending rotor blades or wings 17 and 18 which, in the embodiment shown in FIGS. 1 through 3, are arranged for rotary movement about a generally upright axis over the top of the fuselage. In the arrangement shown in FIGS. 4 through 6 in which the aircraft is modified for fixed wing type flight, wings 17 and 18 are positioned to extend transversely above the fuselage and are secured against rotation about the upright axis and thus provide the principal airfoil fixed wing lift surfaces. Details of the mounting arrangement by which the wings are operatively connected with the rotor pylon will be described hereinafter.

In the aircraft embodiment shown in FIGS. 1 through 6, the means for propelling the aircraft both in fixed wing and rotary wing type flight includes propelling devices 19 and 21 secured to the outboard ends of the respective wings 17 and 18. In one preferred embodiment of the aircraft, such propelling devices may comprise tip mounted turbo-jet engines of a well known type. However, other modified propulsion arrangements, as will be described hereinafter, may be equally well employed with the subject aircraft.

The tail structure 2 of the aircraft includes in conjunction with the horizontal stabilizers 3 conventional pilot operable pitch control flaps 26 and in conjunction with the upright stabilizer 4 a conventional pilot operable yaw control rudder flap 27. Because these features of the aircraft, which are intended to function primarily when the aircraft is in fixed wing type flight, are well known as is their mode of operation, details thereof will not be described herein.

Also provided in conjunction with the tail structure of the aircraft as seen in FIGS. 2 and 5 is means 29, to be described, for imparting yaw control to the aircraft when the same is flown as a helicopter or during landing and take-off as a fixed wing aircraft to compensate as necessary for yaw moments which may be produced. As noted in FIG. 5 such means 29 may be covered by selectively closable vanes when the aircraft is operating as a fixed wing type aircraft.

As also seen in FIGS. 1 through 6, supporting means, desirably in the form of substantially rigid struts, are provided in conjunction with the aircraft for supporting the wings when the same are positioned for fixed wing flight. Such strut means also may be employed for bracing the pylon 16 if deemed necessary when the wings are arranged for helicopter flight. Such strut means may take various forms but in the embodiment illustrated comprise a pair of substantially rigid strut members 31 and 32 which, in the manner to be described, may be selectively engaged with the rotor pylon or with the undersides of the respective wings.

Referring now to FIGS. 10 and 11, the mounting arrangement for the respective wings 17 and 18 on the rotor head assembly will be described. The subject aircraft is intended primarily to function as a helicopter, except during those times when the same is being ferried under its own power over relatively long distances. Accordingly, a rotor head assembly of any suitable type which is operable by conventional helicopter type pilot controls may be employed. In this connection, and merely by way of example, the rotor head assembly, designated generally 36, which is employed with the embodiment illustrated, may embody the construction of that shown in Hiller et al. Patent No. 2,631,679. Such rotor head is operatively mounted on the upper end of a hollow rotor shaft 37 which extends upwardly through the rotor pylon 16.

Reference is directed to Patent No. 2,631,679 for constructional details of the rotor head and its mode of operation. Briefly, however, the same comprises a rotatable pitch control wobble ring 38 to which are connected a pair of diametrically opposed linkages 39 and 41 which in turn are operatively connected to a rotor hub 42. Extending upwardly through the rotor column and hub 42 and projecting above the top of the hub is a collective pitch change rod 43 which is operatively connected to the aircraft pilot controls for collectively modifying the pitch of the respective wings in the well known manner.

As seen in FIGS. 10 and 11, the wings extend transversely from the rotor hub 42 and are operatively secured thereto by a pair of oppositely extending journaled supporting shafts 46 and 47 on which the respective wings 17 and 18 are mounted. Each of the shafts 46 and 47 is rotatably secured to the rotor hub in the well known manner so that the shafts and the wings mounted thereon may be rotated about their respective longitudinal axes (indicated generally by line A—A in FIG. 11) for effecting pitch change during helicopter type flight.

As perhaps best seen in FIG. 11, each of the supporting shafts desirably is provided with a pair of flanges 48 and 49 which are respectively located adjacent the leading edges L and trailing edges T of the respective wings. Each flange is provided with an aperture 51 intended to removably receive therethrough a bolt or like connector 52 having a removable nut 53 on the lower end thereof.

Each bolt connector is universally connected in well known fashion, such as by a ball and socket arrangement, to one of a pair of links 56 and 57 which in turn are pivotally connected at their other ends to the upper end of aforementioned collective pitch change rod 43.

With the wings arranged in helicopter fashion as seen in FIGS. 10 and 11, movement of the pitch change rod 43 upwardly in rotor shaft 37 will effect rotation of both leading edges L of the wings downwardly in unison while movement of the pitch change rod downwardly will effect rotation of the wing leading edges upwardly in unison. This is conventional in helicopter operation to modify collectively the wing pitch for effecting altitude changes and the like.

With the subject arrangement, while the aircraft is at rest on the ground, it is a simple matter to bring the leading edges of the respective blades into substantial alignment facing generally in the same direction merely by operatively disengaging one of the links 56 and 57 from its associated flange. That is, referring to FIG. 11, link 57 may be disengaged from trailing edge flange 49 of wing 17 so that such wing may be rotated through approximately 180° about supporting rod 46 to bring the leading edges of both wings into substantial alignment. Thereafter, the disengaged link 57 may be engaged with the opposite leading edge flange 48.

In this latter arrangement in which the wings are arranged with their leading edges oriented in the same general direction and with the links engaged with one leading edge flange and one trailing edge flange as described, movement of the pitch change rod 43 upwardly will effect movement of the leading edge of wing 17 upwardly while the leading edge of wing 18 will be moved downwardly. The converse is true when rod 43 is moved downwardly in the rotor shaft.

In this manner, with the wings positioned for fixed wing type flight, aileron or roll control may be imparted to the aircraft if desired by employing the conventional helicopter collective pitch mechanism to rotate the wing leading edges uniformly but in opposite directions, rather than in the same direction as during conventional helicopter type flight. In this regard, the mechanism for rotating the wings as described may be actuated by conventional fixed wing type aircraft pilot controls, such as a stick or wheel, operatively connected therewith. Such operation is optional in obtaining roll control, however, and other methods, such as by providing separate aileron flaps in the wing trailing edges operable by conventional pilot controls, may be employed.

While the rotor hub construction described and illustrated is of sufficient strength to support the wings operatively for rotation during helicopter type flight, it has been found desirable to employ supporting means to brace or support the wings when the same are arranged for fixed wing type flight. In this connection, the aforementioned struts 31 and 32 preferably are employed, each of which desirably is of hollow airfoil shaped construction. As seen in FIGS. 7 and 10, each of the struts is operatively connected adjacent its lower end to a fixed part of the aircraft, such as fuselage section 7 in the vicinity of the landing gear enclosures 8. For this purpose, a swivel or universal type joint of the type shown in FIG. 9 or 9a may be employed. While a joint 60 of the type seen in FIG. 9 is shown employed with the aircraft in FIG. 10, it should be understood that a joint 61 of the type seen in FIG. 9a also is interchangeably usable therewith.

At its upper end, each strut is to be engaged with a wing under surface or with a side of the rotor pylon by means of a releasable hinge joint 62. In the embodiment seen in FIGS. 7, 8 and 10, joint 62 comprises a conventional hinge defined by a first series of spaced fingers 63 operatively secured by welding, bolting or the like to the wing under surface, and by a second series of spaced interfitting fingers 64 extending from and secured to the strut upper end, such as by means of an insert secured by rivets or the like to the strut. Each of the hinge interfitting fingers is transversely apertured and a removable bolt type fastener 66 is extended therethrough to maintain the strut fingers and wing fingers engaged. While it has been described that the first series of fingers 63 are provided on the wing, it should be understood that a similar series of fingers also are provided on the opposite sides of the rotor pylon as seen in FIG. 10 to be engaged with the fingers of the strut when the strut is arranged to brace the rotor pylon during helicopter type flight.

So that each strut may be easily moved between its wing bracing and pylon bracing positions, a universal type pivotal mounting preferably is employed at the lower strut end such as that shown at 60 in FIG. 9. Such mounting comprises a joint defined by a yoke member 71 the bifurcated end of which is interengaged with spaced fingers 72 of an insert secured to the lower end of the strut. A pin 73 extends through the yoke and the fingers and operatively maintains the same together. The lower end of the yoke is defined by a pin 74 which extends through an apertured fitting 76 riveted or otherwise secured to the fuselage section 7 of the aircraft.

With such an arrangement, each strut may be pivoted not only about the axis of pin 73 but also about the longitudinal axis of pin 74 so that a substantially universal type mounting arrangement is imparted to the strut lower end. As a result, the strut may be disengaged at its upper end from the pylon, pivoted about the axis of pin 74 to the dotted line position of FIG. 7, and thereafter pivoted about the axis of pin 73 to the wing bracing position.

If desired, a ball type universal joint 61 of the type shown in FIG. 9a may be employed at the bottom of each strut to provide the pivotal connection required to permit each strut to be selectively engaged with a wing or with the rotor pylon. In such arrangement an insert 77 which includes a ball socket 78 at its lower end is secured on the strut lower end. A spherical ball 79 is mounted on the upper end of a fitting 81 riveted or otherwise secured to the fuselage section 7. Such ball is received within the socket 78. In this manner, each strut is mounted for universal movement about the ball so that each strut may be universally rotated about the ball 79 as required during disengagement of the strut with a wing and engagement thereof with the rotor pylon, and vice versa.

If it is desired to employ the wings for roll control as described previously by rotating the wing leading edges in opposite directions by using the helicopter pitch change controls, this may readily be accomplished in a given aircraft by providing a ball type joint of the type seen in FIG. 9a at the top of each strut. In this manner, the necessary universal connections will be provided which will permit the wings to be rotated about their axes. In such case, a hinge connection of the type illustrated at 62 in FIG. 8 or 60 in FIG. 9 may be employed at the bottom end of each strut to impart the requisite rigidity to such an arrangement.

A further novel feature of this invention resides in the fact that it is contemplated that the struts themselves may be employed to impart roll control to the aircraft during fixed wing flight. That is, by mounting the struts as seen in FIG. 9b, they may be rotated about their longitudinal axes to serve as ailerons to impart roll control to the aircraft. Because the struts are substantially wide and preferably are of airfoil contour, if the same are rotated in opposite directions about their respective axes, selective roll control will be imparted to the aircraft.

To permit the struts to serve as ailerons while at the same time performing their wing bracing function, each is provided with an internal shaft 82 which preferably has a ball joint 61 of the type described secured to its lower end and a hinge joint 62 at its upper end. Each strut surrounds its associated shaft and is rotatable about the axis thereof. Provided adjacent the lower end of each strut are a pair of eye fasteners or the like 83 and 84 which are to be engaged with opposite ends of control cable 85 as schematically seen in FIG. 7. Each cable in turn is connected to any suitable pilot control (not shown) so that rotation of the struts about their respective axes may be effected.

When no rotation of the struts about their respective axes is desired, such as when the same are positioned to brace the rotor column during helicopter type flight, fairings 89 (note FIGS. 8 and 10) contoured to present a smooth airfoil surface desirably are positioned over the ends of the struts to preclude rotation thereof during flight and to reduce drag.

As mentioned previously, the propulsion system employed with the subject aircraft may vary, with wing tip mounted turbo-jet engines being one of the more desirable propulsion arrangements employable. Because this arrangement does away with heavy propulsion mechanisms inside the fuselage for driving the rotor blades or for propelling the aircraft in fixed wing flight, an increased load carrying capacity is provided.

Figure 12:
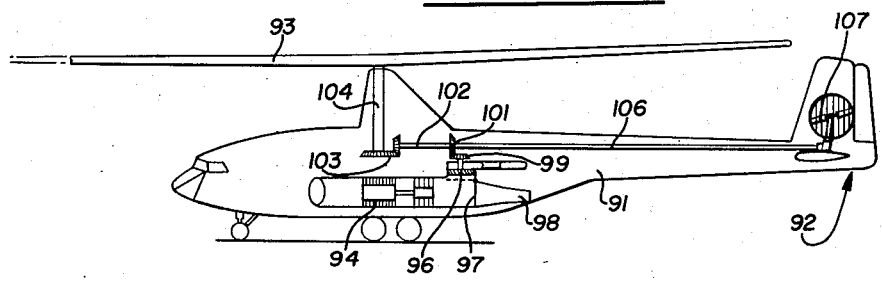
FIGS. 12 through 14 are generally schematic views of modified propulsion systems for aircraft of the type described.
Figure 13:
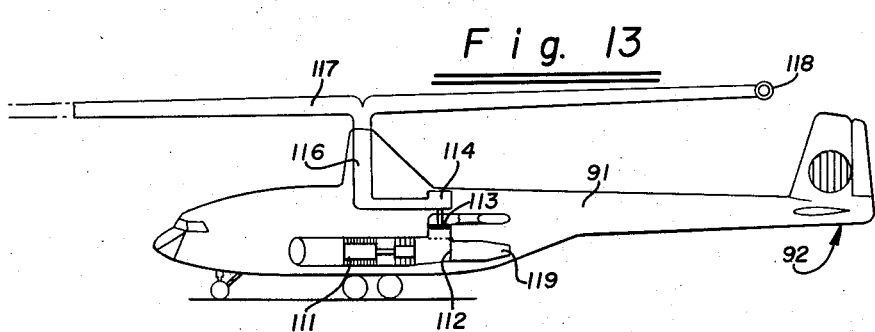
Figure 14:
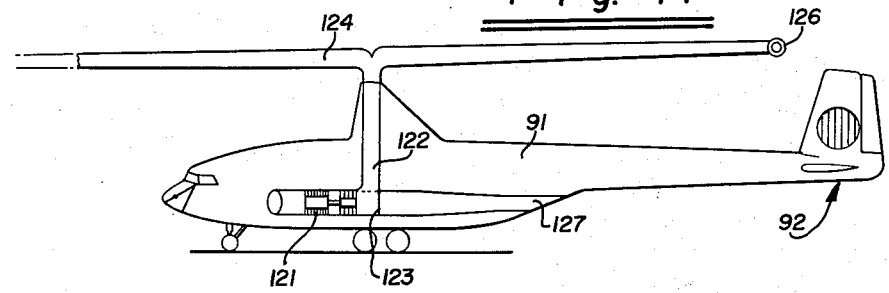

Referring to FIGS. 12 through 14, several other types of propulsion arrangements have been illustrated which may be employed with the subject aircraft. In this connection, with each of the aircraft schematically illustrated in FIGS. 12 through 14, it should be understood that the wing mounting and bracing arrangement is the same as that described previously.

In each of FIGS. 12 through 14, an aircraft fuselage 91 of a construction somewhat different from that illustrated in FIGS. 1 through 11 has been shown, primarily to indicate that the fuselage of the subject aircraft may take various forms. With such modified construction, however, the tail assembly structure 92 employed therewith corresponds substantially to that described previously.

With respect to FIG. 12, a mechanically driven arrangement for rotating the wing structure 93 of the aircraft is illustrated. Such construction includes a turbo jet or like gas producing engine 94 the exhaust from which may be directed against a free power turbine 96 when a diverter valve 97 is moved from the dotted line position shown to the solid line position shown to close off the tail pipe extension 98 extending rearwardly from the gas producing section. When the diverter valve is closed as shown, the free power turbine is rotated which rotates a bevel gear 99 operatively connected therewith, which in turn, by means of a second bevel gear 101, rotates a drive shaft 102 geared at 103 to the rotor drive shaft 104. Operatively connected with gear 101 as an extension of shaft 102 is a tail rotor drive shaft 106 which is operatively connected to a torque compensating tail rotor 107 operatively located in the tail structure.

When it is desired to fly the aircraft of FIG. 12 as a conventional fixed wing aircraft with the wings thereof located transversely of the fuselage and secured against rotation, the diverter valve 97 may be pivoted upwardly to the dotted line position shown in FIG. 12 thereby exposing the tail pipe 98 so that the thrust gases produced in the gas producing section of the engine will be directed rearwardly of the aircraft to propel the aircraft forward.

FIG. 13 illustrates another modified aircraft the propulsion system of which comprises a turbo jet gas producing engine 111 the exhaust from which is directable by means of a diverter valve 112 against a free power turbine section 113 which in turn is operatively connected to a compressor 114. The compressor in turn is directly connected by means of a hollow upright conduit 116 to a hollow wing structure 117 so that the gases may be directed rearwardly of the leading edges of the respective wings through tip jet nozzles 118 provided on the outboard ends of the respective wings.

When the diverter valve 112 is moved to the dotted line position shown in FIG. 13, the exhaust from the gas producing section 111 of the engine is directed rearwardly of the aircraft through the exhaust tail pipe 119 to propel the aircraft forward.

FIG. 14 shows still another modified construction of the aircraft which includes a turbo jet engine which includes a gas producing section 121 the exhaust from which is selectively directed without intermediate compressors or like arrangements through a hollow upright shaft 122 by means of a diverter valve 123 into the hollow wing structure 124.

When the diverter valve is in the solid line position shown in FIG. 14, the gas from the turbo jet engine is directed into the hollow wing structure 124 to be exhausted through tip nozzles 126 mounted on the outboard ends of the respective wings. With the valve moved to the dotted line position shown in FIG. 14, the aircraft is ready for conventional fixed wing flight and is propelled by the exhaust from the engine rearwardly through the exhaust tail pipe section 127.

While certain modifications in the propulsion means employable with the subject aircraft have been illustrated, it should be understood that other propulsion means which may become apparent to a person skilled in the art after this disclosure has been studied also may be used herewith.

FIGS. 15 through 18 illustrate one arrangement for imparting yaw control to the aircraft. Yaw control means is provided in the tail structure of those aircraft requiring such control during helicopter flight, such as the modification shown in FIG. 12. In such an arrangement, the drive shaft 106 for the tail rotor 107 mentioned previously is operatively connected by interengaged bevel gears 131 to an upright shaft 132 operatively engaged in any well known manner to the tail rotor positioned in the upright section of the tail structure.

When the aircraft is employed for fixed wing flight, the tail rotor is not normally employed and, to provide a smooth airfoil surface on the upright portion of the tail structure, the tail rotor may be covered on opposite sides thereof by series of selectively openable and closeable vanes 133 which, when closed as seen in FIGS. 15 and 17, cooperate to present substantially smooth airfoil surfaces. However, when the vanes are open as seen in FIG. 16 and in dotted lines in FIG. 17, the tail rotor is exposed for performing its intended function.

Preferably the vanes 133 are selectively opened or closed by means of a control cable and pulley arrangement (FIG. 18) comprising a pilot operable cable 134 which passes over a pulley 136 which is pinned to a cross arm 137 on opposite ends of which are secured a pair of vane operating arms 138, to each of which is secured in spaced relationship the respective vanes.

The cable 134 may be controlled by a separate pilot control or may be operatively engaged with the control for the tail rotor 107 so that, upon actuation of the tail rotor during helicopter flight, the vanes will automatically be opened by rotating pulley 136 in a predetermined direction.

From the foregoing, it should be understood that a convertible aircraft construction has been provided which is transformable on the ground from a helicopter type aircraft into a fixed wing type aircraft, and vice versa, for long range transport or ferrying operations by reorienting one of the rotary wings thereof so that the leading edge of such one wing is positioned to face in generally the same direction in substantial alignment with the leading edge of the other wing.

Having thus made a full disclosure of the subject invention and preferred embodiments thereof, reference is directed to the appended claims for the scope to be afforded hereto.

I claim:

1. A helicopter type aircraft designed primarily for helicopter type flight which is convertible on the ground to adapt the same for fixed wing type flight, including fixed wing type take-off and landing, so that said aircraft may be ferried over long distances generally as a fixed wing type aircraft, whereby the need to employ auxiliary transport vehicles to transport said aircraft over long distances is precluded: said aircraft comprising a fuselage including a tail structure having mechanisms thereon for controlling said aircraft during both helicopter and fixed wing type flight, said mechanisms including yaw control means for compensating for yaw moments produced during helicopter type flight and during take-off and landing during fixed wing type flight; a rotor head surmounting a rotor shaft above said fuselage; a pair of oppositely directed airfoil contoured rotor wings extending from said rotor head, each of said wings being rotatably connected with said head so that the pitch of said wings may be selectively modified during helicopter type flight, each of said wings having dissimilar leading and trailing edges, the leading edges of said wings normally being oppositely oriented to face in opposite directions for helicopter type flight; means mounting at least one of said wings with said rotor head for rotation about its longitudinal axis at least about 180°, so that the leading edges of both said wings may be brought into similar orientation facing in the same general direction for fixed wing type flight, said mounting means including mechanism operatively and disengageably connecting said one wing with said rotor head so that such wing may be operatively disengaged from said head and rotated at least about 180° and operatively reengaged with said head with the leading edge of such wing similarly oriented with respect to the leading edge of the other wing; aircraft propelling thrust means mounted on each of said wings adjacent the outboard end thereof, said wings providing substantially the principal airfoil lift surfaces for said aircraft during both fixed wing and helicopter type flight of said aircraft; and means for securing said wings when the leading edges thereof are similarly oriented in a position extending transversely of said fuselage with said wing leading edges facing forwardly of said fuselage, whereby said aircraft may be operated as a fixed wing type aircraft during long distance ferrying operations.

2. The helicopter aircraft of claim 1 which includes structure in conjunction with said yaw control means of said tail structure for covering such means so that a drag reducing generally smooth tail structure airfoil surface is provided when such means is not in use.

3. The helicopter aircraft of claim 1 in which said propelling means comprises a jet engine mounted at the tip of each of said wings, said jet engines being oppositely oriented to effect rotation of said wings about the axis of said rotor shaft during helicopter type flight and similarly oriented to propel said aircraft forward during fixed wing type flight, said jet engines defining the sole means for propelling said aircraft during flight.

4. A convertible helicopter aircraft designed primarily for helicopter type flight and convertible on the ground for fixed wing type flight for long distance ferrying operations, comprising a fuselage, a supporting shaft projecting from said fuselage, a rotor hub on said shaft, a pair of rotor wings each of which has leading and trailing edges extending transversely of said hub adjacent the top of said shaft, means operatively and pivotally connecting said wings with said hub, said means including mechanism whereby at least one of said wings may be rotated about an axis extending longitudinally thereof at least about 180°, control means engageable with said wings for pivoting said wings about their respective axes in opposite directions when said wings are oriented for fixed wing type flight and in the same direction when said wings are oriented for helicopter type flight, and thrust means on each of said wings adjacent the outboard end thereof for propelling said aircraft during fixed wing type flight and during helicopter type flight; said control means including a pair of links at least one of which is detachably connected between said one wing and said hub so that such wing may be operatively disengaged from said hub, rotated at least about 180° about its longitudinal axis, and operatively reengaged with such hub in opposite orientation, whereby said wings may be selectively oriented with their leading edges facing in the same general direction for fixed wing type flight and in opposite directions for helicopter type flight.

5. A helicopter type aircraft designed primarily for helicopter type flight which is convertible on the ground for fixed wing type flight, including fixed wing type take-off and landing, so that said aircraft may be ferried over long distances generally as a fixed wing type aircraft, whereby the need to employ auxiliary transport vehicles to transport said aircraft over long distances is precluded: said aircraft comprising a fuselage including a tail structure having mechanisms thereon for controlling said aircraft during both helicopter and fixed wing type flight, said mechanisms including yaw control means for compensating for yaw moments produced during helicopter type flight and during take-off and landing during fixed wing type flight; a rotor head surmounting a rotor shaft above said fuselage; a pair of oppositely directed airfoil contoured rotor wings extending from said rotor head, each of said wings being rotatably connected with said head so that the pitch of said wings may be selectively modified during helicopter type flight, each of said wings having dissimilar leading and trailing edges, the leading edges of said wings normally being oppositely oriented to face in opposite directions for helicopter type flight; means mounting at least one of said wings with said rotor head for rotation about its longitudinal axis at least about 180°, so that the leading edges of both said wings may be brought into similar orientation facing in the same general direction for fixed wing type flight, said mounting means including mechanism operatively and disengageably connecting said one wing with said rotor head so that such wing may be operatively disengaged from said head and rotated at least about 180° and operatively reengaged with said head with the leading edge of such wing similarly oriented with respect to the leading edge of the other wing; aircraft propelling jet thrust means mounted on each of said wings adjacent the outboard end thereof, said wings providing substantially the principal lift surfaces for said aircraft during both fixed wing and helicopter type flight of said aircraft; and strut means selectively positionable between each of said wings and said fuselage when the wings are oriented for fixed wing type flight to brace said wings, said strut means being airfoil contoured and mounted for pivotal movement about the longitudinal axis thereof so that said strut means may be selectively pivoted to impart roll control to said aircraft during fixed wing type flight.

6. A method of transporting a helicopter to a distant location generally beyond the range of said helicopter when the same is flown in helicopter type flight by transforming said helicopter on the ground to a fixed wing type aircraft and flying the same generally as a fixed wing type aircraft, said helicopter comprising a fuselage, a rotor column projecting above said fuselage, a pair of rotor wings operatively connected to said column normally for rotation above said fuselage, pitch change means normally connected with said wings, and a pair of struts normally operatively extending between said fuselage and said column; said method comprising operatively disengaging one of said wings from said pitch change means, rotating said one wing about its own longitudinal axis while such wing is operatively engaged with said column to bring corresponding edges of said wings into similar orientation relative to said fuselage, reengaging said one wing at a different location thereon with said pitch change means, locating said similarly oriented wings transversely of said fuselage, disengaging said struts from said column, engaging the thus disengaged struts with said wings whereby said wings are maintained in relatively fixed non-rotatable relationship above said fuselage about the axis of said column, and propelling said aircraft and controlling the same while thus propelled as a fixed wing type aircraft, said aircraft during such propulsion being sustained in flight substantially principally by said wings whereby auxiliary supporting surfaces which would interfere with aircraft control during helicopter type flight are unnecessary.

7. The method of claim 6 which includes employing said struts for roll control of said aircraft during flying thereof to said distant location.

8. A method of transporting a helicopter type aircraft over long distances without employing auiliary transporting vehicles, said aircraft including a fuselage, a rotor shaft projecting from the top thereof, wing means for sustaining said aircraft during flight which consists essentially of a pair of rotary wings operatively connected to said shaft for rotation above said fuselage, jet propulsion means on said wings, and wing pitch change means normally connected with said wings, by transforming said aircraft into a fixed wing type aircraft on the ground so that said aircraft may be ferried over long distances as a fixed wing type aircraft; said method comprising disengaging one of said wings from said pitch change means, rotating said one wing at least about 180° about its own longitudinal axis to bring corresponding edges of both wings into similar orientation relative to said fuselage, reengaging said pitch change means with said one wing, positioning said wings to extend transversely of said fuselage, securing said wings against rotation above said fuselage when said wings are thus oriented and positioned, and propelling said aircraft with said propulsion means on said wings and controlling the same generally as a fixed wing aircraft during such propulsion, said wings during fixed wing type flight providing substantially the principal means sustaining said aircraft during flight whereby the need for auxiliary lift surfaces on said fuselage which would interfere with aircraft control during helicopter type flight are precluded.

9. A convertible helicopter aircraft designed primarily for helicopter type flight and convertible on the ground for fixed wing type flight for long distance ferrying operations, comprising a fuselage, a supporting shaft projecting from said fuselage, a rotor hub on said shaft, a pair of rotor wings each of which has leading and trailing edges extending transversely of said hub adjacent the top of said shaft, means operatively and pivotally connecting said wings with said hub, said means including mechanism whereby at least one of said wings may be rotated about an axis extending longitudinally thereof at least about 180°, control means connected to said wings for pivoting said wings about their respective axes in flight, thrust means on each of said wings for propelling said aircraft during fixed wing type flight as well as during helicopter type flight; said control means including at least one link which is detachably connected between said one wing and said hub so that such wing may be operatively disengaged from said hub rotated at least about 180° about said longitudinal axis, and operatively reengaged with such hub in opposite orientation, whereby said wings may be selectively orientated on the ground with their leading edges facing in the same general direction for fixed wing flight and in opposite directions for helicopter type flight; and bracing means detachably connectable between each of said wings and a fixed part of the aircraft when the aircraft is on the ground for securing the wings against rotation about the axis of said rotor shaft when they are orientated with their leading edges facing the same direction transversely of the fuselage to provide for fixed wing flight of the aircraft.

10. The aircraft of claim 9 wherein said detachably connectable means between each wing and a fixed part of the aircraft comprises a strut.

11. A method of ferrying a helicopter over long distances so that the need to employ auxiliary transporting vehicles for transporting said helicopter over such distances is precluded; said helicopter being convertible on the ground for fixed wing type flight and comprising a fuselage including a tail structure having mechanisms thereon for controlling said aircraft during helicopter type and fixed wing type flight including thrust means for regulating yaw of said helicopter during helicopter type flight, a rotor head surmounting a rotor shaft above said fuselage, a pair of rotor wings having their leading edges oppositely oriented and projecting in opposite directions from said head, each wing having dissimilar leading and trailing edges and having power means adjacent its outboard end to effect rotation of said wings about the axis of the rotor shaft for providing the propulsion and sustaining means of the helicopter during helicopter flight, said helicopter being otherwise free of traction propeller means for propelling the same, each of said wings being also rotatably connected with said head for pivotal pitch change movement about an axis extending longitudinally of the wing with at least one of said wings rotatable at least about 180° about such axis, control means connected to said wings for effecting pitch change thereof in helicopter operation including a link member detachably connected between said one wing and said head whereby said one wing may be operatively disengaged from said head and rotated at least about 180°, said wings defining generally the principal lift surfaces for sustaining said aircraft during helicopter type and fixed wing type flight; said method comprising positioning said helicopter on the ground with said rotor wings stationary, disconnecting said link member from said one wing, rotating said one wing at least about 180° to bring the leading edges of said wings into similar orientation with the leading edges thereof facing in the same general direction, detachably connecting a bracing member between each wing and a fixed part of the aircraft for securing the thus similarly oriented wings against rotation about the axis of said rotor shaft with said wings extending transversely of said fuselage and with said leading edges facing forwardly, and thereafter flying said aircraft with said wings thus fixed against rotation about said rotor shaft axis to a predetermined distant destination at which said helicopter may be reconverted after landing on the ground for helicopter type flight, said wings during such flight serving as substantially the principal supporting surfaces for said aircraft.

12. A method of transporting a helicopter type aircraft over long distances generally greater than the range of said aircraft in helicopter type flight, said aircraft comprising a fuselage, a rotor head normally rotatable above said fuselage, means for sustaining said aircraft during helicopter flight consisting essentially of a pair of rotor wings having dissimilar leading and trailing edges and operatively connected with said head with their leading edges normally oppositely oriented, said helicopter being otherwise free of traction propeller means for propelling the same, each of said wings being rotatably connected with said head for pivotal pitch change movement about an axis extending longitudinally of the wing with at least one of said wings being rotatable at least about 180° about such longitudinal axis so that the leading edges of both said rotor wings may be similarly oriented, control means connected to said wings for effecting pitch change thereof in helicopter operation including a link member detachably connected between said one wing and said head whereby said one wing may be operatively disengaged from said head and rotated at least about 180°, and jet power means on said wings adjacent the outboard ends thereof for rotating the wings about the axis of said head to propel the aircraft during helicopter flight; said method comprising positioning said aircraft on the ground for conversion from helicopter type flight to fixed wing type flight, while said aircraft is on the ground disconnecting said link member from said one wing and then bringing the leading edges of both said wings into similar orientation by rotating said one wing at least about 180° about its longitudinal axis, arranging the thus similarly oriented wings to extend transversely of said fuselage with their leading edges facing forwardly of said fuselage, detachably connecting a bracing member between each wing and a fixed part of the aircraft for securing said wings against rotation about the axis of said rotor head, activating said jet power means, and controlling said aircraft when said jet power means are actuated to take off and fly to a predetermined distant location as a fixed wing type aircraft, said wings during such flight serving as substantially the principal supporting means for said aircraft, whereby the need for auxiliary transporting vehicles is thereby precluded.

References Cited in the file of this patent

UNITED STATES PATENTS

| | | |
|---|---|---|
| 1,650,954 | Miller | Nov. 29, 1927 |
| 1,848,321 | Cresci | Mar. 8, 1932 |
| 2,518,007 | Herrick | Aug. 8, 1950 |
| 2,653,779 | Terry | Sept. 29, 1953 |
| 2,949,737 | Fletcher | Aug. 23, 1960 |

FOREIGN PATENTS

| | | |
|---|---|---|
| 625,166 | Germany | Feb. 5, 1936 |
| 368,129 | Italy | Feb. 9, 1939 |
| 606,420 | Great Britain | Aug. 13, 1948 |
| 748,540 | Great Britain | May 2, 1956 |